US008484015B1

(12) United States Patent
Wolfram et al.

(10) Patent No.: US 8,484,015 B1
(45) Date of Patent: Jul. 9, 2013

(54) ENTITY PAGES

(75) Inventors: Stephen Wolfram, Champaign, IL (US); Christopher Williamson, Savoy, IL (US); Oyvind Tafjord, Eugene, OR (US)

(73) Assignee: Wolfram Alpha LLC, Champaign, IL (US)

( * ) Notice: Subject to any disclaimer, the term of this patent is extended or adjusted under 35 U.S.C. 154(b) by 290 days.

(21) Appl. No.: 12/780,651

(22) Filed: May 14, 2010

(51) Int. Cl.
G06F 17/27 (2006.01)
G06F 17/21 (2006.01)
G06F 17/20 (2006.01)
G06F 17/30 (2006.01)

(52) U.S. Cl.
USPC ............ 704/9; 704/10; 704/1; 707/771

(58) Field of Classification Search
USPC ............ 704/1, 9, 10; 707/706, 708, 769, 707/771
See application file for complete search history.

(56) References Cited

U.S. PATENT DOCUMENTS

| | | |
|---|---|---|
| 4,734,854 A | 3/1988 | Afshar |
| 4,740,886 A | 4/1988 | Tanifuji et al. |
| 4,841,441 A | 6/1989 | Nixon et al. |
| 4,949,253 A | 8/1990 | Chigira et al. |
| 5,038,296 A | 8/1991 | Sano |
| 5,315,710 A | 5/1994 | Kishimoto et al. |
| 5,394,509 A | 2/1995 | Winston |
| 5,448,740 A | 9/1995 | Kiri et al. |
| 5,485,601 A | 1/1996 | Ching |
| 5,499,371 A | 3/1996 | Henninger et al. |
| 5,555,367 A | 9/1996 | Premerlani et al. |
| 5,559,939 A | 9/1996 | Wada et al. |
| 5,634,024 A | 5/1997 | Yamaguchi |
| 5,640,576 A | 6/1997 | Kobayashi et al. |
| 5,696,962 A * | 12/1997 | Kupiec ................................ 1/1 |
| 5,768,590 A | 6/1998 | Kimura et al. |
| 5,815,713 A | 9/1998 | Sanders |
| 5,815,717 A | 9/1998 | Stack |
| 5,987,505 A | 11/1999 | Fry et al. |
| 6,038,560 A | 3/2000 | Wical |

(Continued)

FOREIGN PATENT DOCUMENTS

| | | |
|---|---|---|
| EP | 0 442 240 A2 | 8/1991 |
| WO | WO-97/40425 A2 | 10/1997 |
| WO | WO-2006/014892 A2 | 2/2006 |
| WO | WO-2006/015006 A2 | 2/2006 |

OTHER PUBLICATIONS

"AppleScript," Wikipedia, Nov. 20, 2009.

(Continued)

*Primary Examiner* — Jesse Pullias
(74) *Attorney, Agent, or Firm* — Marshall, Gerstein & Borun LLP

(57) ABSTRACT

An answer engine determines an entity related to a query from a user in a system designed for computation, search, or other activities involving the processing of queries. The system determines whether an entity page for the entity is stored in an answers database and, if so, retrieves and displays the stored entity page. If there is no stored entity page for the entity, the answer engine generates and displays an answer to the query and may optionally store the answer as an entity page. Additionally, the answer engine may pre-generate and store entity pages according to algorithmic variation of received queries and/or according to information received from external sources.

37 Claims, 9 Drawing Sheets

U.S. PATENT DOCUMENTS

| | | | |
|---|---|---|---|
| 6,076,051 | A | 6/2000 | Messerly et al. |
| 6,084,585 | A | 7/2000 | Kraft et al. |
| 6,169,986 | B1 | 1/2001 | Bowman et al. |
| 6,173,441 | B1 | 1/2001 | Klein |
| 6,216,139 | B1 | 4/2001 | Listou |
| 6,256,665 | B1 | 7/2001 | Fry et al. |
| 6,275,976 | B1 | 8/2001 | Scandura |
| 6,289,513 | B1 | 9/2001 | Bentwich |
| 6,493,694 | B1 | 12/2002 | Xu et al. |
| 6,502,236 | B1 | 12/2002 | Allen et al. |
| 6,505,157 | B1 | 1/2003 | Elworthy |
| 6,584,464 | B1 | 6/2003 | Warthen |
| 6,589,290 | B1 | 7/2003 | Maxwell et al. |
| 6,675,159 | B1 | 1/2004 | Lin et al. |
| 6,684,388 | B1 | 1/2004 | Gupta et al. |
| 6,704,728 | B1 | 3/2004 | Chang et al. |
| 6,742,162 | B2 | 5/2004 | Bennett |
| 6,876,314 | B1 | 4/2005 | Lin |
| 6,877,155 | B1 | 4/2005 | Lindsey |
| 6,901,399 | B1 * | 5/2005 | Corston et al. ............ 1/1 |
| 6,973,640 | B2 | 12/2005 | Little et al. |
| 6,996,801 | B2 | 2/2006 | Yoneyama |
| 7,120,574 | B2 * | 10/2006 | Troyanova et al. ............ 704/9 |
| 7,137,100 | B2 | 11/2006 | Iborra et al. |
| 7,197,739 | B2 | 3/2007 | Preston et al. |
| 7,222,333 | B1 | 5/2007 | Mor et al. |
| 7,263,517 | B2 | 8/2007 | Sheu et al. |
| 7,269,822 | B2 | 9/2007 | Gebhart et al. |
| 7,373,291 | B2 | 5/2008 | Garst |
| 7,440,968 | B1 * | 10/2008 | Oztekin et al. ............ 1/1 |
| 7,451,135 | B2 | 11/2008 | Goldman et al. |
| 7,454,701 | B2 | 11/2008 | Graeber |
| 7,613,676 | B2 | 11/2009 | Baisley et al. |
| 7,620,935 | B2 | 11/2009 | Baisley et al. |
| 7,685,507 | B2 | 3/2010 | Workman et al. |
| 7,747,601 | B2 * | 6/2010 | Cooper et al. ............ 707/708 |
| 7,844,594 | B1 * | 11/2010 | Holt et al. ............ 707/709 |
| 8,091,024 | B2 | 1/2012 | Graeber |
| 8,135,696 | B2 * | 3/2012 | Safoutin ............ 707/706 |
| 2002/0023144 | A1 * | 2/2002 | Linyard et al. ............ 709/218 |
| 2002/0099743 | A1 | 7/2002 | Workman et al. |
| 2002/0116176 | A1 * | 8/2002 | Tsourikov et al. ............ 704/9 |
| 2002/0140734 | A1 | 10/2002 | Bennett |
| 2002/0143810 | A1 | 10/2002 | Bennett |
| 2002/0174120 | A1 * | 11/2002 | Zhang et al. ............ 707/7 |
| 2003/0145022 | A1 * | 7/2003 | Dingley ............ 707/204 |
| 2003/0191765 | A1 | 10/2003 | Bargh et al. |
| 2004/0001109 | A1 | 1/2004 | Blancett et al. |
| 2004/0049499 | A1 | 3/2004 | Nomoto et al. |
| 2004/0088158 | A1 | 5/2004 | Sheu et al. |
| 2004/0103405 | A1 | 5/2004 | Vargas |
| 2004/0128649 | A1 | 7/2004 | Grundy et al. |
| 2005/0005258 | A1 | 1/2005 | Bhogal et al. |
| 2005/0080780 | A1 | 4/2005 | Colledge et al. |
| 2005/0097464 | A1 | 5/2005 | Graeber |
| 2006/0020886 | A1 | 1/2006 | Agrawal et al. |
| 2006/0025987 | A1 | 2/2006 | Baisley et al. |
| 2006/0026576 | A1 | 2/2006 | Baisley et al. |
| 2006/0136411 | A1 | 6/2006 | Meyerzon et al. |
| 2006/0271908 | A1 | 11/2006 | Bargh et al. |
| 2006/0279799 | A1 | 12/2006 | Goldman |
| 2007/0022109 | A1 * | 1/2007 | Imielinski et al. ............ 707/4 |
| 2007/0043574 | A1 | 2/2007 | Coffman et al. |
| 2007/0106657 | A1 | 5/2007 | Brzeski et al. |
| 2007/0203929 | A1 | 8/2007 | Bolivar |
| 2007/0208722 | A1 | 9/2007 | Dettinger et al. |
| 2007/0220034 | A1 | 9/2007 | Iyer et al. |
| 2008/0016040 | A1 | 1/2008 | Jones et al. |
| 2008/0066052 | A1 | 3/2008 | Wolfram |
| 2009/0055733 | A1 | 2/2009 | Graeber |
| 2009/0171923 | A1 | 7/2009 | Nash et al. |
| 2010/0004924 | A1 | 1/2010 | Paez |
| 2010/0293174 | A1 | 11/2010 | Bennett et al. |

OTHER PUBLICATIONS

"Area calculator", http://www.calculator.com, 1 page, Aug. 15, 2006.
"calculator.com", http://www.calculator.com, 2 pages, Aug. 15, 2006.
"Car Lease Calculator", http://www.calculator.com, 1 page, Aug. 15, 2006.
"Currency Calculator", http://www.calculator.com, 1 page, Aug. 15, 2006.
"Fractions calculator", http://www.calculator.com, 1 page, Aug. 15, 2006.
"General Loan Calculator", http://www.calculator.com, 1 page, Aug. 15, 2006.
"Google Code," <http://code.google.com/>, Mar. 17, 2005, p. 1-11.
"Graphing calculator", http://www.calculator.com, 1 page, Aug. 15, 2006.
"Home—Finance", http://www.calculator.com, 2 pages, Aug. 15, 2006.
"Home Equity Calculator", http://www.calculator.com, 1 page, Aug. 15, 2006.
"How Much Can I Afford Calculator", http://www.calculator.com, 1 page, Aug. 15, 2006.
"Length Adding Calculator", http://www.calculator.com, 1 page, Aug. 15, 2006.
"Love Calculator", http://www.calculator.com, 1 page, Aug. 15, 2006.
"Mortgage Payment Calculator", http://www.calculator.com, 1 page, Aug. 15, 2006.
"Mortgage Qualification Calculator", http://www.calculator.com, 1 page, Aug. 15, 2006.
"Percent calculator", http://www.calculator.com, 1 page, Aug. 15, 2006.
"Rent versus Buy Calculator", http://www.calculator.com, 1 page, Aug. 15, 2006.
"Scientific calculator", http://www.calculator.com, 1 page, Aug. 15, 2006.
"Standard calculator", http://www.calculator.com, 1 page, Aug. 15, 2006.
"Temperature calculator", http://www.calculator.com, 1 page, Aug. 15, 2006.
"The Mortgage Calculator," <http://www.hughchou.org/calc/mortold.html>, Aug. 8, 1996, p. 1-7.
"Time Calculator", http://www.calculator.com, 1 page, Aug. 15, 2006.
"Unit Conversion Calculator", http://www.calculator.com, 1 page, Aug. 15, 2006.
Adorni, et al., "Natural Language Input for Scene Generation," Proceedings of the first conference on European Chapter of the Association for Computational Linguistics, pp. 175-182 (1983).
Asperti et al., "A content based mathematical search engine: Whelp," 2004, p. 1-15.
Estival et al., "Towards Ontology-Based Natural Language Processing," http://acl.ldc.upenn.edu/ac/2004/nlpxml/pdf/estival-etal.pdf, accessed Mar. 8, 2010, 8 pages.
Jones et al., "Generating Query Substitutions," ACM WWW 2006, May 23-26, 2006, pp. 387-396.
Kamareddine et al., "Restoring Natural Language as a Computerised Mathematics Input Method," Proceedings of the 14th symposium on Towards Mechanized + Mathematical Assistants: 6th International Conference, pp. 280-95 (2007).
Ko et al., "The State of the Art in End-User Software Engineering," accepted for publication in ACM Computing Surveys, vol. 43 Issue 3, Apr. 2011.
Lavrov, "Program Synthesis," Cybernetics and Systems Analysis, vol. 18, No. 6 pp. 708-715 (Nov. 1982).
Meyers, A., "VOX—An Extensible Natural Language Processor," http://dli.iiit.ac.in/ijcai/IJCAI-85-VOL2/PDF/026.pdf, accessed Mar. 8, 2010, 5 pages.
Moore, Gregory M., "Calculator Code: Programming Code for Use within a Scientific Calculator," Fall 2005, p. 1-29.
Myers et al., "Natural Programming Languages and Environments," Communications of the ACM, vol. 47, No. 9, pp. 47-52 (Sep. 2004).
Office Action for related U.S. Appl. No. 12/780,685, dated Feb. 15, 2012.
Office Action for related U.S. Appl. No. 12/780,705, dated Jan. 31, 2012.

Osogami, "A Study of Input and Output Conditions for Automatic Program Generation," Memoirs of the Fukui Institute of Technology, vol. 37 pp. 273-278 (2007).

Sucan, Ioan Alexandru, "A Search Engine for Mathematical Formulae," May 7, 2006, p. 1-17.

Trott, Michael, "Mathematical Searching of the Wolfram Functions Site," 2005, The Mathematica Journal, p. 713-726.

Trott, Michael, "The Functions Website," 2003, The Mathematical Journal, p. 1-10.

Wang et al., "Mining Term Association Patterns from Search Logs for Effective Query Reformulation," ACM CIKM 2008, Oct. 26-30, 2008, pp. 479-488.

* cited by examiner

FIG. 4C

ENTITY PAGES

BACKGROUND

Search engines, such as Internet search engines, have been in use for some time. Such search engines permit the user to form a search query using combinations of keywords to search through a web page database containing text indices associated with one or more distinct web pages. The search engine looks for matches between the search query and text indices in the web page database, and then returns a number of hits which correspond to URL pointers and text excerpts from the web pages that represent the closest matches.

Some Internet search engines attempt to detect when a user has entered a query incorrectly. For example, the Google™ search engine employs a "Did you mean . . . ?" feature that essentially runs a spellchecker on user queries. The spellchecker attempts to detect when an entered word is misspelled by checking it against a database of common words and their misspellings. When a possible misspelling is detected, the search engine may provide to the user a prompt to invoke an alternative query in which the misspelled word is spelled correctly.

Some search engines utilize natural language processing (NLP) techniques. Some of these search engines may attempt to discern what search results the user is seeking, and return a number of hits which correspond to the URL pointers of web pages that represent the closest matches (or all of the matches sorted by some estimation of relevance). Other search engines using NLP techniques may attempt to determine the answer the user is seeking, and may attempt to determine that answer. Many NLP techniques generally far short of a human-like capacity to determine based on text what information the user seeks, much less determine an answer to the user's query.

Some semantic NLP systems also perform word sense disambiguation to identify the sense in which a word is used in a given query. Several NLP systems perform disambiguation by consulting a comprehensive body of world knowledge. This is done through hierarchies or ontologies, as well as many simple factual statements about the world. In an entity-relationship model definition, a database has two logical parts, entities and relations. Entities are defined in relation to other entities, and semantic maps are created which assist in disambiguating words based on the context in which those words are used. One problem with this approach is that a successful disambiguation requires significant processing resources. Once disambiguation is complete, and in cases in which the system does not employ disambiguation, the system expends processing resources determining an answer to the natural language (NL) query. The nature of language means that many NL queries may resolve to the same answer. Accordingly, many NL queries may result in the same answer, and the system may waste resources repeatedly generating the same answer in response to multiple received queries.

BRIEF DESCRIPTION OF THE DRAWINGS

FIG. 4C illustrates still another exemplary web page that may be displayed in accordance with various presently described embodiments;

SUMMARY OF THE DISCLOSURE

Figure 1:
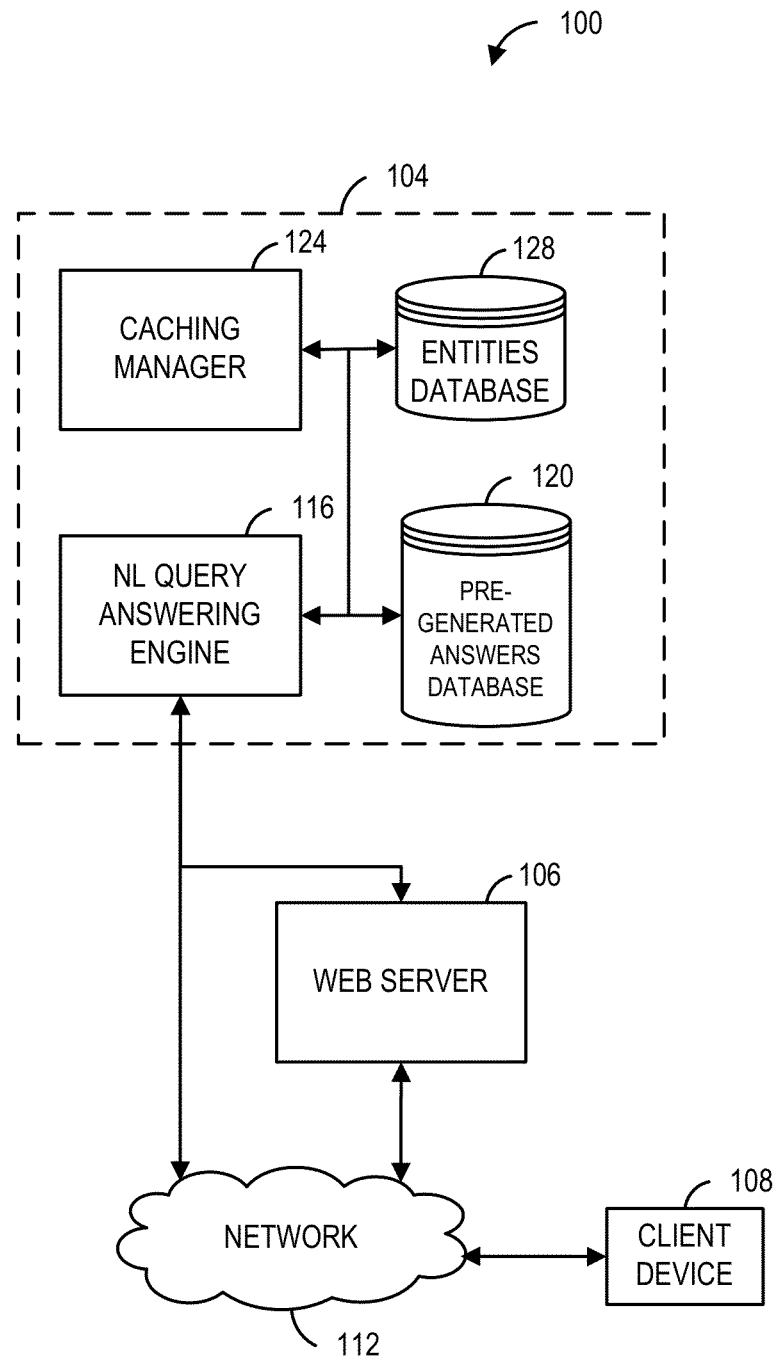
FIG. 1 illustrates a block diagram of an embodiment of a system for generating and storing answers to natural language queries in accordance with the present description.

A method for use in a natural language (NL) system that generates answers to NL queries includes receiving a NL query and determining whether a pre-generated answer to the NL query is stored in a database. When the system determines that a pre-generated answer to the NL query is stored in the database, the system may provide the pre-generated answer in response to the NL query. Alternatively, when the answer to the NL query does not exist in the database, the system may generate a dynamic answer to the NL query and provide the dynamic answer in response to the NL query. The method may also include determining whether to store the generated dynamic answer to the NL query and, if so, storing in the database the generated dynamic answers. Further still, the method may include making the stored dynamic answer available to one or more search engines separate from the NL system.

A method for use in a natural language (NL) system that generates answers to NL queries includes determining a set of one or more potential NL queries that are related to a first NL query for which a pre-generated answer is stored in a database of the NL system, determining one or more respeoctive answers to the one or more potential NL queries, and storing in the database the one or more respective answers to the one or more potential NL queries in the set. Determining a set of one or more potential NL queries that are related to a first NL query may include receiving the first NL query, interpreting the first NL query to generate a second query, and algorithmically varying the second query to generate one or more third queries. Interpreting the first NL query to generate a second query could include disambiguating the first NL query to determine a first entity associated with the first NL query and determining a category of the first entity. The system may vary the second query to generate one or more third queries by substituting for the first entity one or more second entities of the same category as the first entity. Alternatively or additionally, interpreting the first NL query to generate a second query could include determining a first entity associated with the first NL query and determining a queried attribute of the first entity. The system may vary the second query to generate one or more third queries by substituting for the queried attribute one or more second attributes of the first entity.

A method for use in a natural language (NL) system that generates answers to NL queries includes determining a set of one or more potential NL queries that are related to a first NL query for which a pre-generated answer is stored in a database of the NL system, determining one or more respeoctive answers to the one or more potential NL queries, and storing in the database the one or more respective answers to the one or more potential NL queries in the set. Determining a set of one or more potential NL queries may include receiving one or more of data from a news source, data from a blogging service, data from a social networking service, data from a community-based news article website, data from a news aggregator, trend data from a web-based reference source, and trend data from a search engine.

A natural language system includes a first database, a second database, a caching manager communicatively connected to each of the first and second databases, and a NL query answering engine communicatively connected to the caching manager. The first database may include a plurality of entities categorized by class and sub-class and a plurality of attributes associated with the entities, or may include a plurality of entities categorized into one of a plurality of classes and subclasses and a plurality of attributes, each attribute associated with at least one of the plurality of classes and sub-classes.

A tangible storage medium storing machine executable instructions that, when executed by one or more machines, may cause the machine to determine a set of one or more potential NL queries that are related to a first NL query for which a pre-generated answer is stored in a database of the NL system, may determine one or more respective answers to the one or more potential NL queries in the set, and may store in the database the one or more respective answers to the one or more potential NL queries in the set. Additionally, the stored instructions may cause the one or more machines to receive the first NL query, interpret the first NL query to generate a second query, and algorithmically vary the second query to generate one or more third queries.

DETAILED DESCRIPTION

Embodiments described herein generally relate to answering natural language (NL) user queries. In particular, embodiments relate to pre-generating and storing answer information that are responsive to corresponding natural language queries input into a system for answering queries. As used herein, the term "natural language" refers to language in a natural or imprecise syntax, such as a human-readable language, pseudo-code, etc. Natural language or language using an imprecise syntax is in contrast to a typical computer programming language syntax, in which exact spelling, exact placement of punctuation, exact placement of parentheses, etc. is necessary to specify a particular formula or expression. Similarly, with typical computer programming language syntax, a slight change in punctuation, for example, could specify a completely different formula or expression, or could render a computer language statement meaningless to a compiler. On the other hand, with an imprecise syntax, a formula can be expressed using language and terms that may be readily understandable to a human, but unintelligible to a computer program such as a compiler. Additionally, with an imprecise syntax, many different variations of language and terms and groupings of language and terms may correspond to one formula. Of course, imprecise syntaxes are not limited to expressing only formulas, but may express any concepts that are conveyable by human-readable language.

Processing of natural language queries generally requires disambiguation of words, phrases, etc. that may connote multiple different meanings or senses depending on a context. Various methods exist for disambiguating a natural language query or a part of a natural language query. One such method, described in co-pending U.S. patent application Ser. No. 12/780,685, entitled "ASSUMPTION MECHANISM FOR QUERIES," and filed on May 14, 2010, which is hereby incorporated by reference herein in its entirety, involves making assumptions regarding the meaning or sense of a term, phrase, etc., based on various heuristics and algorithms. In some embodiments, an entities database may be queried with a word, phrase, etc., from a NL query. The entities database may include categorized entities such as geographical entities, people, companies, etc. In one embodiment, each entity has an associated class/category, an associated sub-class/sub-category. The entities database optionally may include attributes of the entities. Some attributes may be common to the class and/or to the sub-class, or whereas other attributes instead be specific to the entity. Classes and sub-classes may provide a technique for categorizing entities and the terms "class" and "sub-class" are used interchangeably throughout this specification with the terms "category" and "sub-category."

In some embodiments, context including the classes, sub-classes, and attributes associated with the one or more entities that potentially correspond to a NL query (or a portion of the NL query) are used to disambiguate the query and determine the entity intended by the user. For example, the term "jaguar" may potentially correspond to multiple entities including an automobile or an animal. The entity corresponding to the automobile may have an associated class (e.g., "automobile"), an associated sub-class (e.g., "luxury"), and associated attributes (e.g., engine size, weight, top speed, price, options, etc.). Similarly, the entity corresponding to the animal may have an associated class (e.g., "animal"), an associated sub-class (e.g., "cat," "predator," etc.), and associated attributes (e.g., predator, weight, top speed, habitat, number in the wild, etc.). If, for example, the system receives a NL query that includes the words "jaguar" and "engine size," the system may determine that the user intended to ask a question regarding the entity corresponding to the automobile.

Regardless of how or whether the system disambiguates the NL query, the system may generate an answer to the query. Generating an answer to the query may include solving a formula or equation corresponding to the NL query, retrieving specific data from a database and/or known Internet sources, searching the Internet for related data, processing/analyzing retrieved data, interpreting received data, etc. For some answers generated by the system, the system may store the answer in a database as a unit of information that is associated with one or more of the NL query, the entity, an attribute of the entity, etc. The unit of information may be stored as a web page, a file, or any other suitable unit. The unit of information is referred to herein as an entity page for ease of explanation, but the unit of information need not be a page or a web page. In some embodiments, storing entity pages in the database may conserve processing and/or memory resources the next time the system receives the same NL query or a similar NL query related to the same entity, the same attribute, etc. As described in more detail below, the system may additionally predict other queries it may receive and pre-generate answers to the queries and/or entity pages.

FIG. 1 illustrates an embodiment of a system 100 for generating and storing answers to natural language queries. The system 100 may include, in part, a natural language (NL) query answering system 104 operating in conjunction with a web server 106, for example. One or both of the NL query answering system 104 and the web server 106 may be coupled to a network 112 to which one or more client devices 108 are also coupled. In this context, a user could access a website served by the web server 106 using a browser running on a personal computer, tablet computer, mobile phone (e.g., a smart phone), personal digital assistant (PDA), etc., for example, and could utilize the website to obtain information. It will be understood, however, that the NL query answering system 104 could also be used in other contexts. For example, the system 104 may form part of a "Help" system or other query-based system of a software application, a knowledge database, a computational tool, etc. In such contexts, the user could use the system 104 to obtain information. Also in such contexts, the system 104 could be implemented, at least partially, on a client device, in some embodiments.

As FIG. 1 depicts, the NL query answering system 104 may include a NL query answering engine 116, an answers database 120 storing pre-generated answers, an entity database 128 storing entity information, and a caching manager 124. The NL query answering system 104 operates to disambiguate received NL queries, determine answers to received NL queries, pre-generate NL queries in anticipation of NL queries received from users, and/or generate and store answers to the pre-generated NL queries. The functionality of each of these components is described in detail below.

While FIG. 1 depicts the NL query answering engine 116, the answer database 120, the caching manager 124, and the entities database 128 as part of the NL query answering system 104, those of ordinary skill in the art will recognize that all or part of the NL query answering system 104 may be located on and implemented by one or more servers, one or more client devices, or a combination of servers and client devices. In some embodiments, the NL query answering system 104 is implemented by a server, and the web server 106 provides the user interface through which a user of the client device 108 may access the system 100. In other embodiments, the system 100 implements the NL query answering system 104, or a portion thereof, on the client device 108. In still other embodiments, the system 100 implements part of the NL query answering system 104 on the client device 108 and part of the NL query answering system on a server. For example, the system 100 may implement at least a portion of the answers database 120, at least a portion of the caching manager 124, and, perhaps, a user interface on a client device 108 while implementing the entities database 128 and the NL query answering engine 116 on a server. Of course, other implementations will be readily apparent to one of ordinary skill in the art in view of the present disclosure.

Figure 2:
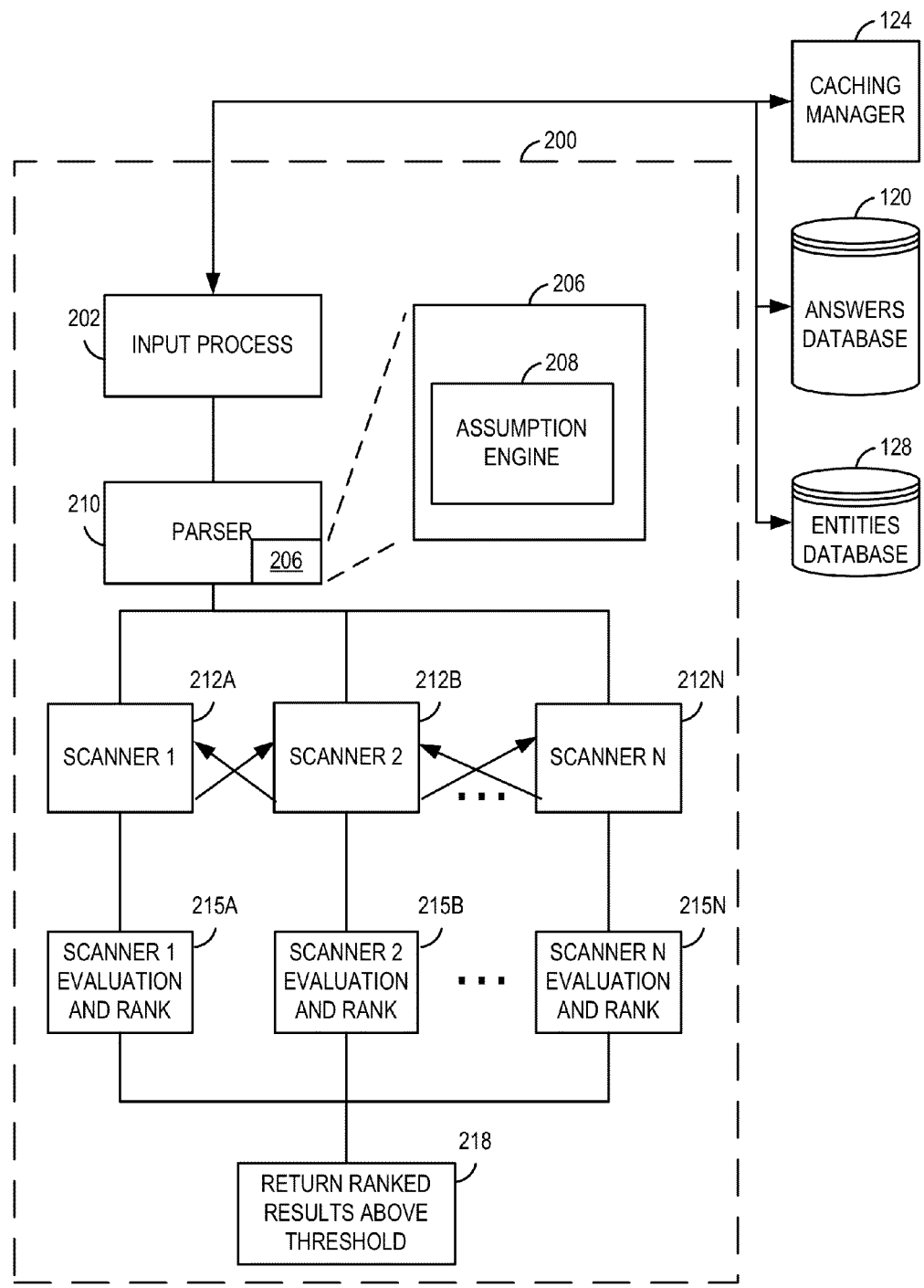
FIG. 2 illustrates a block diagram of an embodiment of a natural language query answering engine such as that of FIG. 1.

The NL query answering engine 116 processes NL queries received from the client device 108 and/or the caching manager 124 and, in some embodiments, processes information related to the answers in response to the NL queries. Processing NL queries may include, among other activities, receiving the NL queries, parsing and/or disambiguating the NL queries, making assumptions about the meanings, senses, etc., of terms, phrases, etc. in the NL queries, generating and/or providing answers to the NL queries, etc. FIG. 2 is a diagram of an example NL query answering engine 200 in accordance with an embodiment. The NL query answering engine 200 includes an input/output module 202, a parser 210, one or more scanners 212A-212N, one or more post-processing modules 215A-215N, and a results module 218. In the course of processing NL queries, and as described below, the NL query answering engine 200 may send to and/or receive information from the answers database 120, the caching manager 124, and/or the entities database 128.

According to an embodiment, the input/output module 202 operates to receive NL queries from, for example, the web server 106, the caching manager 124, and/or some other user interface (e.g., an interface implemented on the client device 108). The input/output module 202 may provide elementary error and consistency checking by, for example, performing spell-checking or ensuring that at least some characters are present. The input/output module 202 may additionally provide an interface between the NL query answering engine 200 and the answers database 120, the caching manager 124, and/or the entities database 128. That is, in addition to receiving NL queries, the input/output module 202 may pass the NL queries to the parser 210, may pass requests for pre-generated answers to the answers database 120 and/or the caching manager 124, may send and/or receive entity information between NL query answering engine 200 and the entities database 128, and may transmit answer information to the caching manager 124 or the answers database 120 for storage.

In some embodiments, some portion or all of the I/O module 202 may be included at a client device, such as the client device 108 of FIG. 1. In some embodiments, some portion or all of the I/O module 202 may be included with the NL query answering system (e.g., the NL query answering system 104 of FIG. 1) at a centrally available device or group of devices, such as a server, a group of networked computing devices, a peer-to-peer network, a cloud computing network, or other centrally available device or group of devices.

In some embodiments, the I/O module 202 or some portion thereof, or the NL query answering engine 200 or some portion thereof, may be a stand-alone executable application. In some embodiments, the I/O module 202 or the NL query answering engine 200 could be an added feature or subsystem of a larger application such as a computational application (e.g., the MATHEMATICA® software system, a spreadsheet application, etc.). For example, the NL query answering engine 200 could be part of a "help" subsystem within a larger application. Additionally, the some or all of the system 200 could be an applet accessed via a website, for example. Further, some or all of the system 200 may also be implemented as a Web service with a Web browser implementing the user interface in a known manner. For example, the I/O module 202 could be a browser plug-in or a toolbar system.

Referring again to FIG. 2, the parser 210, which may be communicatively coupled to the input/output module 202, may examine a received NL query to extract keywords, group words into phrases, identify numerical expressions, categorize data, etc., for example. The parser 210 may perform an initial analysis of the keywords, phrases, or numerical expressions to determine if sufficient information exists to proceed to a further step. When there is not enough information to make even a cursory pass at further analysis, the parser 210 may cause the user to be prompted for additional information such as information that may clarify an answer desired by the user. Alternatively, the system 100 may return the input unchanged with a message that it cannot interpret the input.

In some implementations, the parser 210 may take an initial NL query input and create tokens, and then assemble the tokens into one or more expressions in a precise syntax. In other words, the parser 210 may generally take input data in an imprecise syntax and generate expressions in a precise syntax. As an example, if a user enters the text "prime numbers greater than 100," the parser 210 may create a plurality of tokens: "prime," "numbers," "greater," "than," and "100," where "100" is recognized as a real number and an integer and "prime" is recognized as a property of integers. Then the parser 210 may generate an expression in a precise syntax using these tokens.

Optionally, the parser 210 may perform additional or alternative processing. For example, the parser may attempt to identify phrases. In the example above, the parser 210 may recognize "prime numbers" as a phrase associated with integers divisible without remainder only by itself and 1, and may recognize "greater than" as indicating an inequality (e.g., represented symbolically as ">"). Additionally, the parser 210 may attempt to rearrange tokens to see if the rearrangements match something that the parser 210 understands, such as a phrase. For instance, the parser 210 may utilize algorithmic rearrangements of the input. Also, the parser 210 may cause the user to be prompted to rephrase the input. Then, the parser 210 may analyze the original input in conjunction with the rephrased input. Further, the parser 210 may utilize machine learning techniques to identify language processing algorithms that work better than others.

In performing this processing, the parser 210 may utilize data stored in the entities database 128. As described briefly above, the entities database 128 is a structured database storing entities categorized into classes, sub-classes, etc. and storing attributes for each of the entities and/or attributes of the classes and or sub-classes. The parser 210 may search the entities database 128 for entities matching one or more of the query terms. For example, for a user input query of "population Naples," the parser 210 may search the entities database 128 for one or both of the terms. The entities database 128 may have "Naples" stored as multiple entities, for example the city in Italy and the city in Florida, USA, and the publication Naples Daily News. Each of the entities may have one or more associated classes and/or sub-classes (e.g., "place," "city," "publication," etc.) and may have one or more associated attributes (e.g., latitude, longitude, population, country, state/region, currency, circulation, publication frequency, etc.). The parser 210 may determine that the population may be an attribute of a city but not an attribute of a publication, or may determine that the entities corresponding to Naples, Italy, and Naples, Fla., USA have population attributes while the entity corresponding to Naples Daily News does not. Accordingly, the parser 210 may determine that "Naples" is a city, then proceed to determine whether the city is Naples, Italy or Naples, Fla., USA. Of course, the classes and sub-classes are not limited to geographical entities and publications. Those of ordinary skill in the art will recognize that, depending on the application(s) and/or the particular discipline(s) for which the system 200 is configured, the classes may include the disciplines themselves (e.g., chemistry, mathematics, geography, materials, engineering, health, medicine, food, nutrition, words, linguistics, technology, education, astronomy, earth sciences, sports, music, money, computational sciences, transportation, etc.), applications sub-classes of, or topics within, the disciplines (e.g., mechanics, electricity, magnetism, optics, relativity, particle physics, quantum physics, etc.), etc.

The parser 210 may make certain assumptions about which entity to choose. The parser 210 may use other data, such as statistical information regarding search popularity, the location of a user, etc., to determine to which entity the query corresponds. In the example above, the parser 210 may additionally determine that the phrase "population" may mean "current population," "historical population," or "metro-area population." In some embodiments, the parser 210 may include an assumption system 206. The assumption system 206 may include an assumption engine 208 and may be coupled to the entities database 128. Further, the assumption system 206 may operate substantially in accordance with the assumption system disclosed in U.S. patent application Ser. No. 12/780,685, entitled "ASSUMPTION MECHANISM FOR QUERIES," and filed on May 14, 2010. Briefly, the assumption system 206 may provide an indication of an assumption for each word or phrase that the assumption system 206 recognizes. In some embodiments, the assumption system 206 is able to recognize words and phrases that are stored in the entities database 128. For example, the assumption engine 208 may search for words, phrases, groups of textual characters, etc. that are stored in the entities database 128 and correspond to entities known by the system 100.

The one or more expressions generated by the parser 210 may be provided to one or more scanners 212A, 212B, 212N that may each have a particular focus. For example, scanner 212A may be directed to developing a graphical plot for numerical expressions or phrases parsed from the input that can be reduced to a plot. As an example, if an input includes an expression, such as $x^2$, the scanner 212A may develop and output a plot of $x^2$ (i.e., a parabola). As another example, if the expression is Sin[x]<0.5, the scanner 212A may develop and output a plot of values of x that satisfy this expression. Other scanners 212 may have other specific specializations, such as evaluating equations, determining roots, evaluating integrals, evaluating derivatives, determining relevant transforms, etc. Still other specializations may include, for example, determining mathematical formulas, determining chemical formulas, determining physics formulas, determining financial formulas, determining engineering formulas, determining medical formulas, mapping geographical coordinates, mapping geographical locations, calculating current time, determining the current weather, determining values for various attributes of an entity, calculating information retrieved from the internet, etc.

Depending upon the application, more or less scanners 212 may be utilized. For instance, if an application is to be devoted for use in a financial field, scanners 212 related to chemical formulas may be omitted.

Some scanners 212 may generate results based on a database query (e.g., a query of the entities database 128). For example, a scanner 212 related to geometry formulas may query a database for keywords "area" and "triangle" for formulas related to those terms. As another example, a scanner 212 may query a database for raw data needed to evaluate an expression. For instance, an expression may include c, the speed of light, and a scanner 212 may query a database to retrieve a numerical value for c. As another example, a scanner may collect statistical data and/or attribute data for an entity, such as a population of a particular city, state, or country (e.g., Naples, Italy). The scanner may query the entities database 128 to obtain the needed data. In yet another example, an expression may require real-time data such as "traffic congestion," and a scanner 212 may query an appropriate database to obtain the desired real-time data.

Other scanners 212 may generate results by synthesizing outputs. For example, a scanner 212 for generating indefinite integrals may receive a mathematical expression and synthesize the indefinite integral of that expression, rather than searching a database of pre-generated indefinite integrals. Some scanners 212 may be capable of doing database queries as well as synthesis of results. For example, the scanner 212 related to geometry formulas may generate an expression for the area of a triangle based on a database query, but may also synthesize another expression by integrating parameter values into formulas retrieved from a database. In another example, a scanner 212 querying data for the historical population of Naples, Italy over time may query for discrete population data points year by year, and may also synthesize the discrete data points into a graphical plot for display.

In addition to receiving data from the parser 210, each scanner 212 may share results with each of the other scanners 212. Again, results generated by a scanner 212 based on the shared results may also be shared with each of the other scanners 212, and so on. This process may continue until the scanners 212 no longer have additional data to add, for example. Trivial transforms may also be recognized and blocked. When each scanner 212 has contributed to both the original input from the parser 210 and shared input from all the other scanners 212, the results from each scanner 212 are communicated to respective postprocessors 215A, 215B, 215N. The postprocessors 215A, 215B, 215N evaluate the results and may provide a ranking of each result by assigning a value (e.g., a percentage) to each result.

Particularly in a Web Services or comparable environment, scanners may be added or reconfigured based on user needs. For instance, feedback from users or an analysis of user queries may be utilized to add a scanner devoted to a new field (e.g., organic chemistry) or to add further formula data or information sources to an existing scanner. Similarly, scanners may be omitted or removed.

The ranked results may be passed to a results module 218 which may generate an output having the results with rankings above a certain threshold, while omitting results below the threshold. The threshold may be set at a predetermined level, or may be adjusted according to the number of results and a statistical analysis of the rankings. For example, a query that produces ten thousand results may adjust the threshold to a 99% relevance, thereby limiting the displayed results to the top 100. In another example though, where perhaps only a half a dozen results are returned, all the results may be displayed even though the rankings may be relatively low. The output of the results module 218 may comprise a web page, a window, etc., having one or more formulas, graphs, graphics, text, or output in other formats. Alternatively, the output of the results module may comprise data transmitted to the web server 106, which web server 106 may format the results into a web page before transmitting the web page to the client 108. Typically, but not necessarily, the output generated by the results module 218 is presented by the I/O module 202 at which the original NL query was received.

The system 200, generally or during a specific time period, may generate results related to some of the entities in the entities database 128 more frequently than it generates results related to others of the entities. Alternatively or in addition, the system 200, for various reasons (e.g., current events, popular culture, seasonal topics, etc.), may anticipate queries related to one or more particular entities, or one or more aspects of a particular entity. In accordance with the presently described embodiments, the system 200 may store results corresponding to entities for which the system 100 frequently receives related queries and may generate and store results corresponding to entities for which the system 200 anticipates receiving frequent queries. For example, upon receiving a query related to Naples, Italy, the system 200 may generate and display a web page comprising information related to Naples, Italy and may store it for future use. The information may include, by way of example and not limitation, static information such as the elevation, nearby cities, a nickname, a list of notable people born there, etc. The information may also include sources of dynamic information such as local time, local weather, sunrise and sunset times, etc., and/or may store formulas related to generating or determining dynamic information. The information may include slowly changing information, or information that is updated at relatively long intervals (e.g., annually, bi-annually, etc.) such as city population, metro area population, etc. The stored results may be in the form of a file or an associated set of files, and may include raw data, formulas, hypertext markup language (HTML) statements, extensible HTML (XHTML) statements, etc. In some embodiments, the stored results in the form of a web page. Throughout the remainder of the description, stored results related to a response to a query about a certain entity are referred to as an "entity page" for ease of explanation. It is to be understood, however, that the stored results need not be in the form of a web page or page.

The system 200 may store entity pages in a database, such as the answers database 120 depicted in FIGS. 1 and 2. The caching manager 124 may determine for which entities the system 200 stores entity pages generated in response to received queries. In addition to determining which query responses the system 200 stores as entity pages, the caching manager 124 may generate additional queries for which the system 200 generates and stores entity pages. In some embodiments, the caching manager 124 serves as an entity page "clearing house," receiving disambiguated queries, determining whether the system 200 has previously stored an entity page corresponding the queries and directing the system 200 to the entity pages in the answers database 120. In some embodiments, the caching manager 124 updates records in the entity database 128 to reflect that, for an entity, the system 200 has stored an entity page in the answers database 120.

Figure 3:
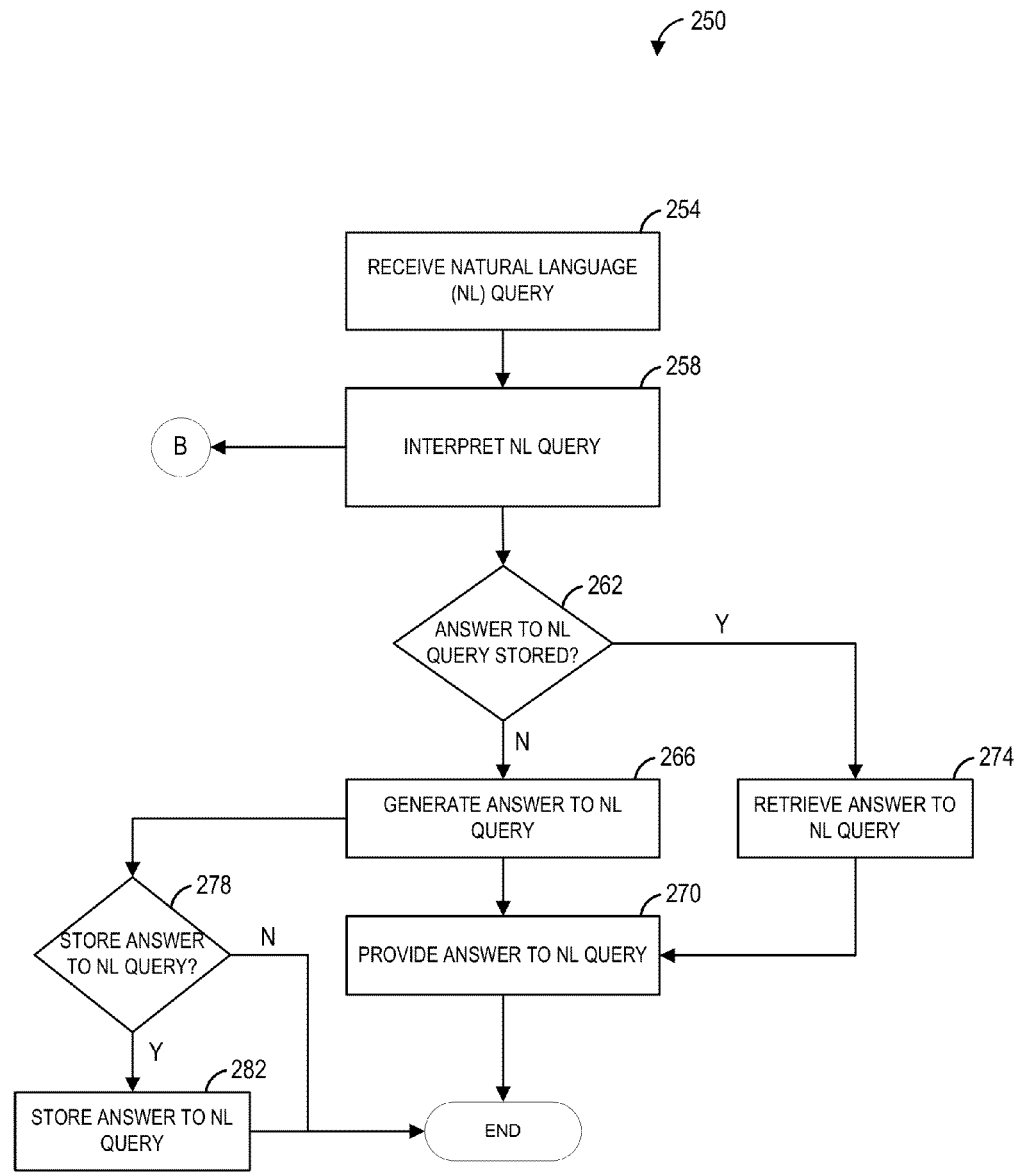
FIG. 3 depicts a flow diagram for a method for providing an answer to a natural language query in accordance with some embodiments of the present description.

FIG. 3 illustrates a flow diagram for an example method 250 for providing an answer to a NL query in accordance with some of the embodiments herein described. The system 200 may receive a NL query (block 254). Receipt of the NL query may be via any suitable method, for example, via a web site served by the web server 106, an application running on the client device 108, or a program executed within a web browser on the client device 108. For example, and with reference to FIG. 4A, a web page 300 may serve as a user interface for the system 100. The web page 300 may include a field 304 for entering a natural language query. Upon submission of a query 308, by pressing the "enter" key or "clicking" on a button 312, the user interface may communicate the query 308 to the NL query answering system 104. In some embodiments, the NL query answering system 104 receives the NL query, via the input/output module 202, for example, and communicates the NL query to a disambiguation module, such as the parser 210 of FIG. 2. The parser 210 may interpret the received NL query (block 258) to determine a disambiguated query. Alternatively or in addition, the parser 210 may determine an entity corresponding to the query.

In any event, after the NL query is interpreted (at block 258), the parser 210 may communicate the disambiguated query to the caching manager 124 to determine whether an entity page corresponding to the query is stored in the answers database 120 (block 262). Of course, in some embodiments, the parser 210 may communicate directly with the answers database 120, or may communicate with the answers database 120 through the input/output module 202. In any event, if it is determined that an answer corresponding to the entity is stored in the answers database 120 (block 262), the caching manager 124 or the NL query answering engine 116 retrieves the entity page from the answers database 120 (block 274) and provides the entity page as an answer the natural language query (block 270).

Figure 4A:
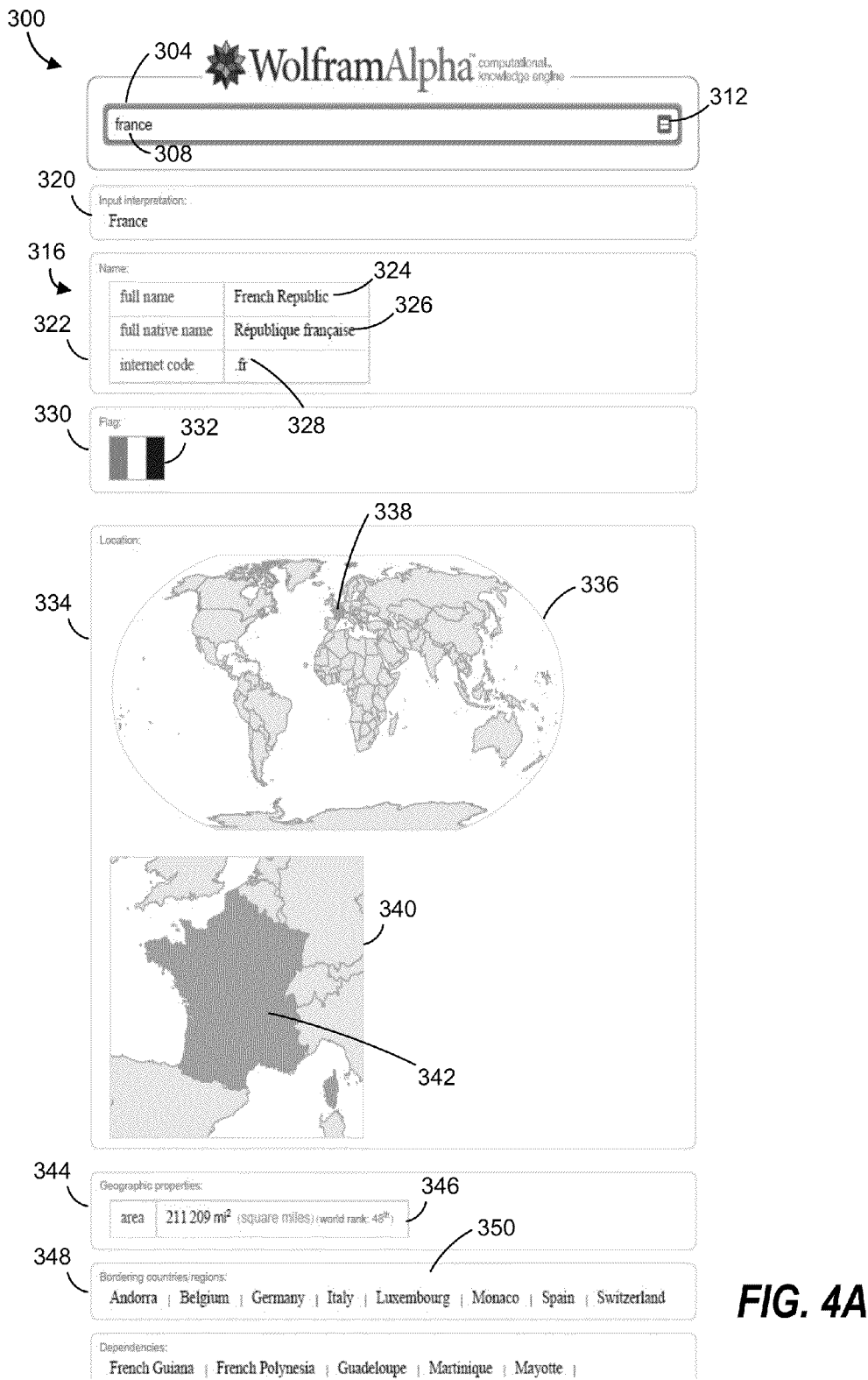
FIG. 4A illustrates an exemplary web page that may be displayed in accordance with various presently described embodiments.

With reference again to FIG. 4A, the web page 300 may, in response to the query, display a retrieved entity page 316. The entity page 316 may include an indication 320 of the input interpretation and/or the entity determined to correspond to the query input. If the NL query answering system 104 determined that the NL query could correspond to other entities, the indication 320 of the input interpretation may also include means for selecting one of the other entities potentially corresponding to the NL query. The entity page 316 may, of course, include other information 322-350 as well. For example, as depicted in FIG. 4A, the entity page 316 for France includes: a section 322 displaying the country's full name 324, the full native name 326, and the internet top level domain 328; a section 330 displaying the country's flag 332; a section 334 depicting the location 338 of the country on a world map 336 and depicting a map 342 of the country on a map 340 of the region; a section 344 indicating geographic properties such as an area 346; a section 348 indicating bordering countries/regions 350; etc. Of course, the entity page 316 may include any other data related to the entity including, but not limited to, demographics, cultural properties, attributes of various cities, economic properties, currency attributes, etc., and entity pages related to other entities and/or types of entities may include other related information as appropriate.

If, instead, it is determined that a pre-generated answer corresponding to the entity is not stored in the answers database 120 (block 262), the NL query answering engine 116 generates the answer the NL query (block 266) and provides the answer, for example, by displaying it on a web page viewed by a user of the client device 108. As those of ordinary skill in the art will readily appreciate, the answer to the NL query may be provided in any known manner. In some embodiments, the NL query answering engine 200 generates answer data (block 266) and provides the answer data to the web server 106, which provides a web page to the client device 108. In other embodiments, the NL query answering engine 200 may generate answer data (block 266) and provide the answer data to the client device 108 via programming code executing on the client device 108.

After the NL query answering engine 200 generates answer data corresponding to the NL query, the NL query answering engine 200 may send the answer data and/or the query to the caching manager 124, which may determine whether the answer should be stored as an entity page (block 278) and, if so, may store the answer as an entity page in the answers database 120. In some alternate embodiments, the NL query answering engine 200 queries the caching manager 124 as to whether the answer data should be stored as an entity page and, if the caching manager 124 responds affirmatively, the NL query answering engine 200 may store the answer as an entity page in the answers database 120 (block 278).

The caching manager 124 may determine whether or not to store the answer to the query as an entity page in a variety of suitable ways. In some embodiments, the caching manager 124 stores an entity page for a query after it receives the query a certain number of times (e.g., more than five times) and/or after it receives the query above a threshold frequency during a given time period (e.g., more than once per day over the course of a week, more than three times within an hour, etc.). In some embodiments, the caching manager 124 stores an entity page for a query in coordination with information from an additional source. The additional source may include information received and/or retrieved from the Internet or some source external to the system 100, statistical information derived from received queries, statistical analysis of information received and/or retrieved from the Internet or some source external to the system 100, or some combination of each. The information received from the Internet or external source may include news feeds, RSS (Really Simple Syndication) feeds, community news websites, search engine trend reports, trend reports received from a web-based reference source, data from news aggregator services, data from social networking sites, blog data, etc.

Figure 4B:
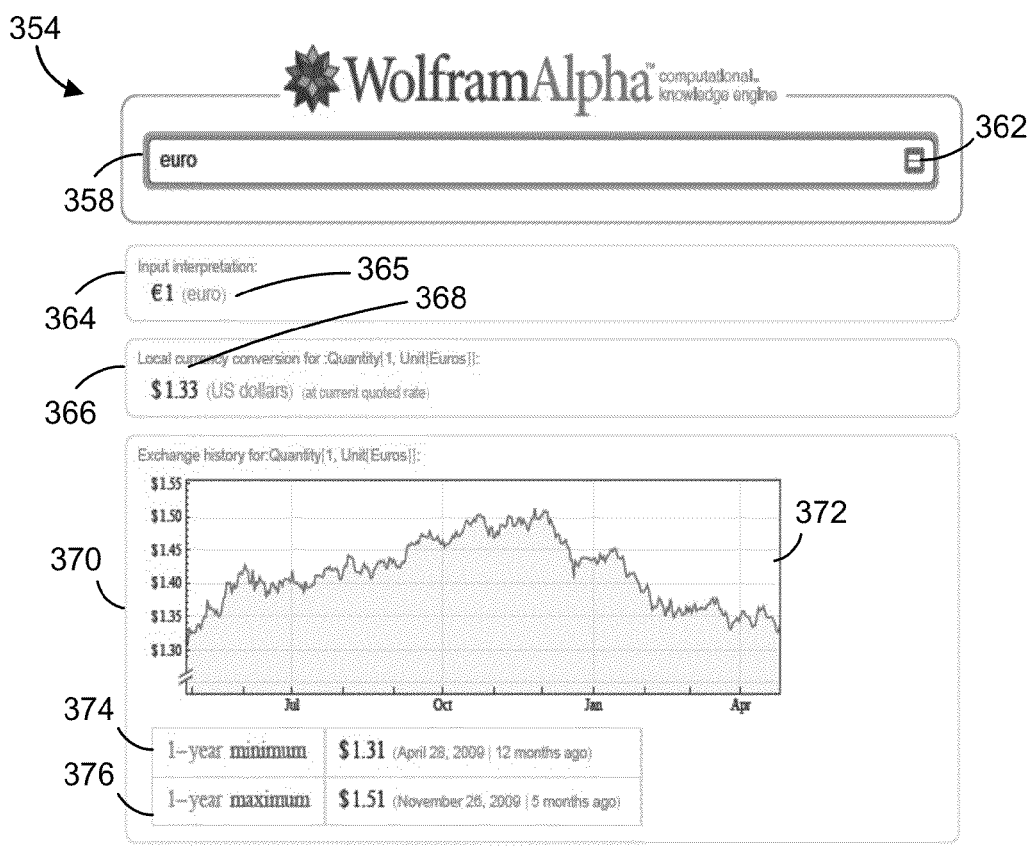
FIG. 4B illustrates another exemplary web page that may be displayed in accordance with various presently described embodiments.

In some embodiments, the system 100 may generate and/or store answers related to dynamic data. Referring now to FIG. 4B, a user interacting with the system 100 via a web page 354 displayed on the client device 108 may enter the term "euro" into a field 358 for entering a natural language query. The user may submit the query by clicking on the button 362, causing the query to be transmitted to and received by the NL query answering system 104 (block 254). The NL query answering engine 116 may interpret the NL query (block 258) to determine one or more potentially relevant entities, and may determine whether an answer corresponding to the query is stored in the answers database 120 (block 262) and, if there is an entity page stored in the answers database 120, may retrieve the entity page. For entity pages, such as the entity page 354, that have dynamic information elements, storing an entity page including only static information for the corresponding query (i.e., "euro") would render the entity page of limited use. Instead, the entity pages stored in the answers database 120 may include programming code for quickly locating and/or calculating current data. Referring again to FIG. 4B, the entity page 354 includes programming code indicating that the entity page 354 includes an input interpretation section 364, which in turn indicates the input query interpretation 365, a section 366 indicating the local currency conversion 368 according to a current rate, and a historical value section 370 indicating a graphical depiction 372 of historical exchange rates and minimum and maximum values 374, 376 over the past year.

The entity page 354 may also include programming code indicating one or more trusted sources of current information that may be used in the entity page. In the example depicted in FIG. 4B, the programming code may include one or more references to financial data feeds and/or financial websites known to have reliable, current information about the value of the Euro. Of course, the programming code may retrieve data from one source or multiple sources. For instance, the programming code may retrieve the current exchange rate from a first source, and may retrieve a history of exchange rates from a second source. As another example, the programming code may retrieve data from multiple sources and use the data that are indicated as most recent and/or most up-to-date. In some embodiments, the programming code stored as an entity page in the answers database 120 may include formulas or other information that allows the system 100 to calculate information that will be displayed on the entity page. For example, the entity page 354 of FIG. 4B may include a listing of currency conversions (i.e., exchange rates) (not shown) relative to the euro. While in some embodiments, the system 100 may retrieve from a reliable source the exchange rates relative to other currencies, as described above, in other embodiments the system 100 could retrieve many exchange rates relative to the US dollar and, using that information and the current exchange rate (also relative to the US dollar) could calculate exchange rates between other currencies. Of course, information such as data labels (e.g., "local currency conversion," "exchange history," "1-year minimum," etc.) may, in any event, remain static.

Figure 4C:
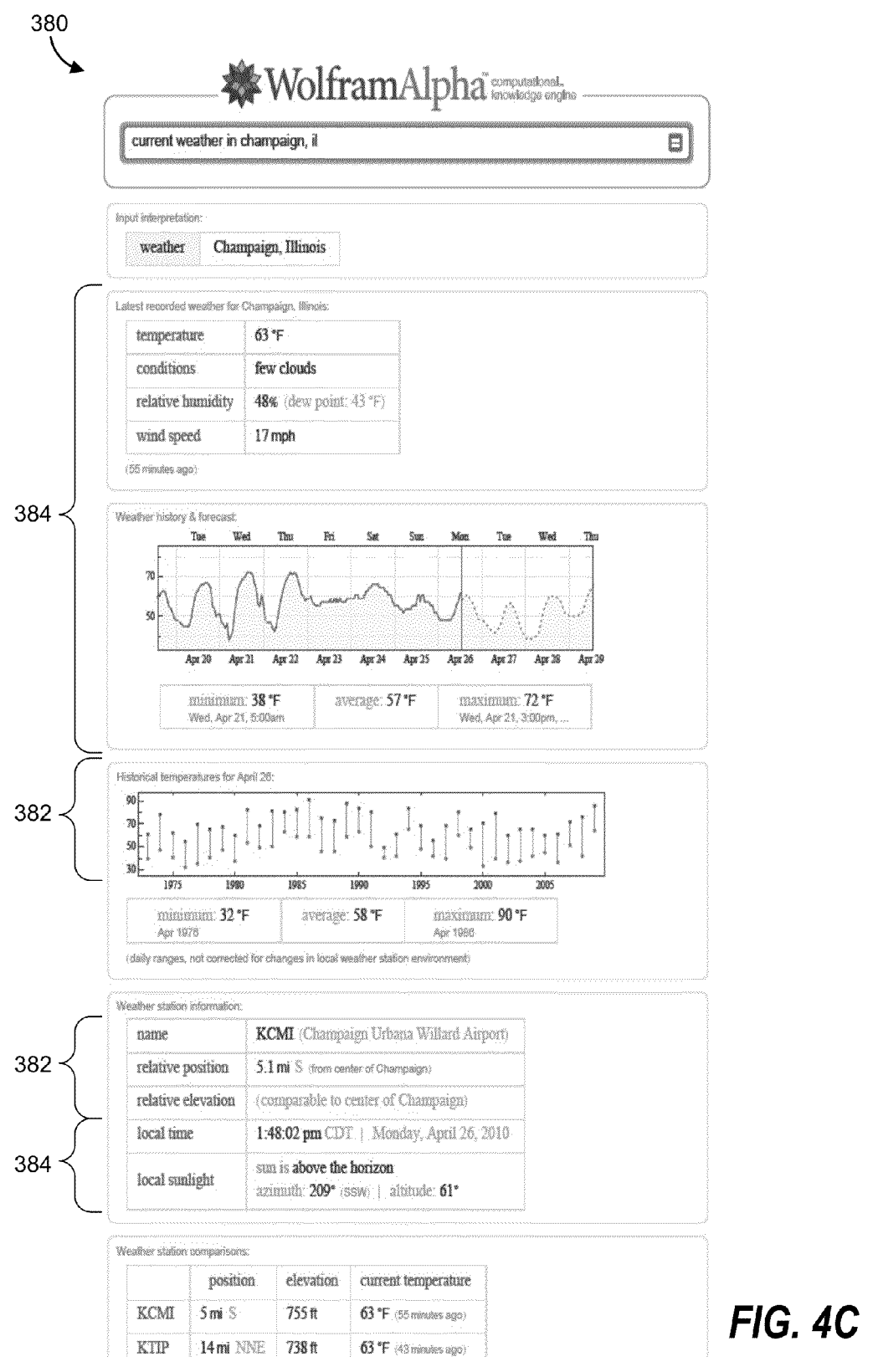

However, in still other embodiments, the entity page stored in the answers database 120 may include both static information (other than data labels and section headings) and dynamic information. FIG. 4C illustrates an example entity page 380 displaying information 382 that is static (e.g., information about the position of the weather station, historical temperatures) and information 384 that is dynamic (e.g., current conditions, local time, whether history/forecast, etc.).

In addition to storing in the answers database 120 entity pages generated in response to received NL queries, the system 100 may, in some embodiments, generate and store one or more entity pages before receiving a corresponding NL query related to the entity pages (i.e., may pre-generate entity pages). Generating and storing entity pages before a user requests them may conserve processing resources and/or bandwidth resources, for example, by allowing the system 100 to generate entity pages during non-peak load times instead of in real time as the system 100 receives queries.

Figure 5:
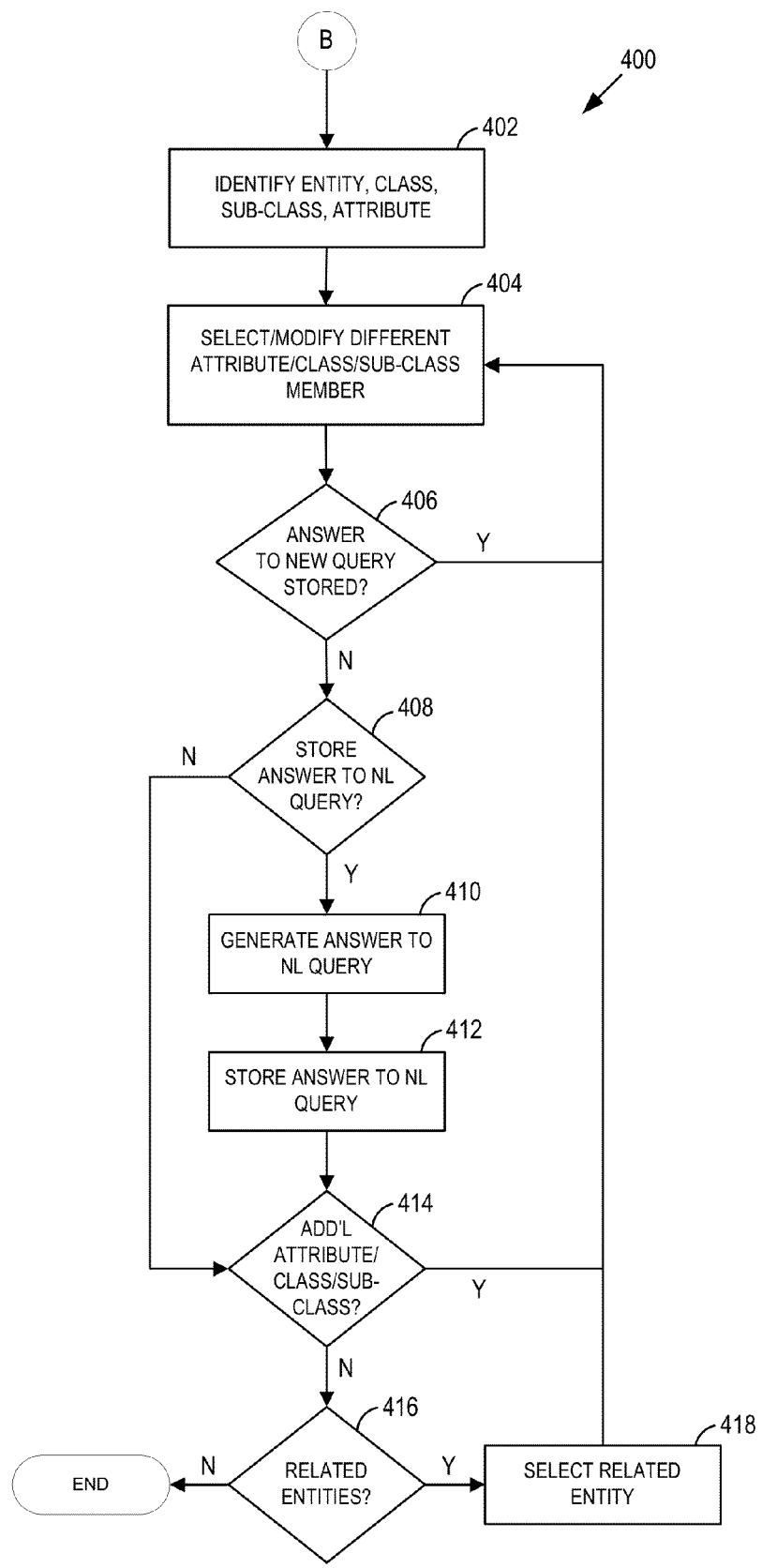
FIG. 5 depicts a flow diagram for a method for varying a received natural language query and generating and storing one or more entity pages.
Figure 6:
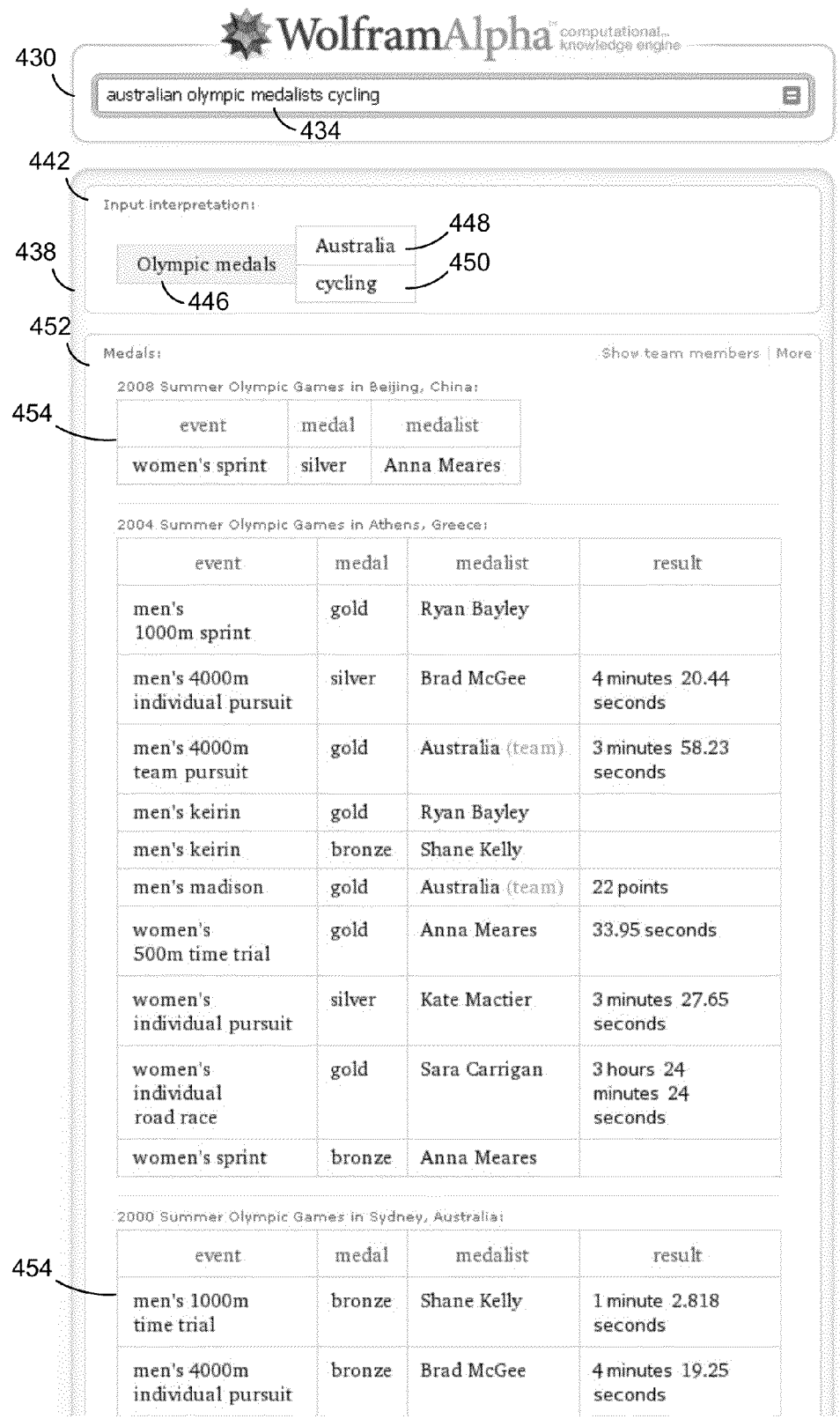
FIG. 6 illustrates yet another exemplary web page that may be displayed in accordance with various presently described embodiments.

In some embodiments, the system 100 may determine one or more entity pages to generate and store by varying a received NL query (or a corresponding disambiguated query) according to an algorithm. For example, in determining queries for which pre-generated answers will be stored, the system 100 may implement a method similar to a method for determining what information to pre-cache from a database. One such method for determining what information to pre-cache is disclosed in U.S. patent application Ser. No. 12/113,183, entitled "Access to Data Collections by a Computational System," filed on Apr. 30, 2008, the entirety of which is hereby incorporated herein by reference. FIG. 5 is a flow chart depicting an example method 400 for varying a query and generating and storing one or more entity pages corresponding to queries other than the received query. Having previously received a query (block 254 in FIG. 3), and interpreted the query (block 258 in FIG. 3), the NL query answering engine 116 will return an entity corresponding to the received query. The caching manager 124 may query the entity in the entities database 128 to determine one or more classes, sub-classes, and/or attributes associated with the entity. Alternatively, the NL query answering engine 116 may provide this information to the caching manager 124. For example, and with reference to FIG. 6, a user may enter into a query input field 430 the phrase "australian olympic medalists cycling" as a query 434. The system 100 may provide an answer 438 to the query employing the method 250, for example, which answer 438 may appear substantially as depicted in FIG. 6. That is, the answer 438 may include an input interpretation 442 that indicates an entity and one or more classes, sub-classes, and/or attributes associated with the entity. The answer 438 depicted in FIG. 6 illustrates that the system 100 has interpreted the entity 446 as "Olympic medals" and the classes/attributes 448, 450 as "Australia" and "cycling." The answer also includes a "Medals" section 452 displaying lists 454 of medalist in various events for various Olympics.

The system 100 and, in particular, the caching manager 124 may decide to pre-generate one or more entity pages related to the received NL query. Referring again to the method 400 illustrated in FIG. 5, the caching manager 124 may identify classes, sub-classes, and/or attributes of the received NL query (block 402). The caching manager 124 may then modify the attribute, class, or sub-class of the query (block 404), generating a different, but related query, and determine whether the answer to that query is already stored in the answers database 120 (block 406). If the answer to the new query is already stored in the answers database 120, the caching manager may again modify the attribute, class, or sub-class of the query (block 404) to generate a new query. If, on the other hand, the answer to the new query is not already stored in the answers database 120, the caching manager 124 may determine whether to store the answer to the new query (block 408). If the caching manager 124 determines that the answer to the new query should be stored in the answers database 120, the caching manager 124 may communicate the new query to the NL query answering engine 116 to generate an answer (block 410). The caching manager may also communicate to the NL query answering engine 116 that it should store the generated answer in the answers database 120, and the NL query answering engine 116 may act accordingly, storing the generated answer in the answers database 120 (block 412). Alternatively, the NL query answering engine 116 may communicate the answer generated to the caching manager 124, which may store the answer in the answers database 120.

If the caching manager 124 determines that the answer to the new query should not be stored to the answers database 120, or when the answer has been generated and stored, the caching manager 124 may determine whether the entity has additional classes, sub-classes, and/or attributes that could be used in the query (block 414). If so, the caching manager 124 selects an additional class, sub-class, or attribute of the entity (block 404) and repeats the process (blocks 404-414). If the entity has no additional attributes, classes, or sub-classes, the caching manager 124 may determine whether there are any related entities (block 416) and, if so, may select the related entity (block 418) and repeat the process with that entity (blocks 404-416). Thus, for the example NL query "australian olympic medalists cycling," the caching manager 124 may generate and store answers for the following additional queries:

Olympic medals Australia canoeing
Olympic medals Australia diving
Olympic medals Australia rowing
Olympic medals Australia sailing
. . .
Olympic medals United States cycling
Olympic medals United States conoeing
Olympic medals United States diving
Olympic medals United States track and field
Olympic medals United States swimming
. . .
World records Australia
World records United States
. . .
Of course, the list of potential additional queries above is exemplary and not exhaustive.

In addition to algorithmically varying a received query, the caching manager 124 may decide to pre-generate and store entity pages according to a variety of other schemes. In some embodiments, the caching manager 124 may track the type and number of queries received, and may employ the algorithmic variation method described above according to the frequency of related queries. For example, the caching manager 124 may receive in a short time period a first query "Canada Olympic medals cycling" and a second query "Canada Olympic medals triathlon." Recognizing the relationship between first and second queries, the caching manager 124 may implement the algorithmic variation of the queries to generate and store other related queries, such as by implementing the method 400. In another example, the caching manager 124 may receive the same query (e.g., "Cancun") several times. In response, the caching manager 124 may determine one or more attributes of the query (e.g., vacation spot, average temperature, tourist destination, located in Mexico, etc.) and may generate and store entity pages for other entities with similar attributes (e.g., Cozumel, Acapulco, Puerto Vallarta, Mazatlan, etc.).

Figure 7:
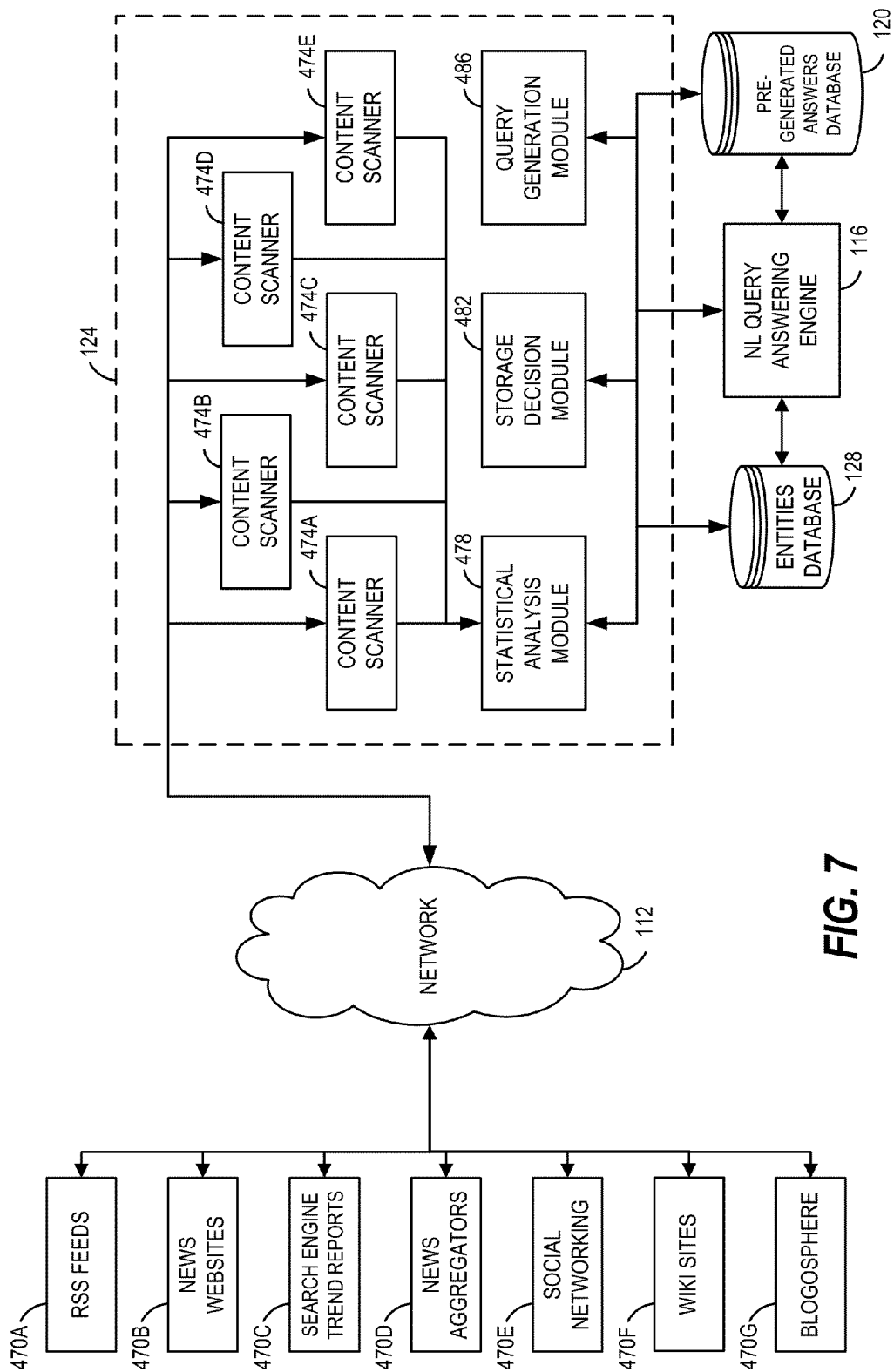
FIG. 7 illustrates block diagram depicting an embodiment of a caching manager in accordance with the present description.

In some embodiments, the caching manager 124 may use information from external sources to determine whether to pre-generate and store an entity page. With reference to FIG. 7, the information may include data received and/or retrieved from one or more sources 470A-G including, by way of example and not limitation, information from: RSS feeds 470A, news websites 470B, search engine statistics/trend pages 470C, news aggregator websites 470D, social networking websites 470E (e.g., Twitter, Facebook, etc.), collaborative websites (e.g., "wikis") 470F, Web-logs ("blogs") 470G, non-collaborative web-based reference sources (e.g., online dictionaries, online encyclopedias, online glossaries, etc.), collaborative web-based reference sources (e.g., collaborative, web-based encyclopedias such as Wikipedia), and any other source (e.g., most often viewed multimedia clips, etc.) that may provide information useable to determine a likelihood of receiving a query related to an entity. The information from the external sources may include raw data (e.g., recent headlines from a news website) and/or processed data (e.g., a search engine ranking of the top 100 searches performed over the past 24 hours). While FIG. 7 depicts only seven external sources, any number of external sources 407 may be considered individually or concurrently to determine which, if any, entity pages to pre-generate and store.

The caching manager 124 may receive the information from the external sources 470 through the network 112. One or more content scanners 474A-E receives the data from the external sources 470. The content scanners 474 may determine key words corresponding to entities and, additionally or alternatively, may provide meta-data about the information received from the external sources 470. In some embodiments, each of the one or more scanners 474 is dedicated to scanning information received from a particular external source 470. In some embodiments, each of the one or more scanners 474 is dedicated to scanning a particular type of information (e.g., news, blogs, social networking, etc.) that may be received from multiple of the external sources 470. Further, in some embodiments the scanners are programmed to seek out a certain type of information or to retrieve information from particular sources. As one example, the content scanner 474A may receive information from a news aggregator in the form of an RSS feed (i.e., refreshing the feed periodically), the content scanner 474B may retrieve information from one or more blogs 470G, the content scanner 474C may retrieve information from a search engine trend report 470C such as Google™ trends, the content scanner 474D may retrieve information from a wiki site 470F such as a collaborative, web-based encyclopedia (e.g., Wikipedia), etc. The content scanners 474 may select relevant information from the external information. Relevant information may be any information used by the caching manager 124 to decide to pre-generate and store an entity page. By way of example and not limitation, relevant information may include entities appearing in news headlines, entities appearing in titles of most-requested multimedia files, entities appearing in a "hot topics" list or a "hot searches" list, entities appearing in a "current events" list or a "topics in the news" list, entities appearing in blog posts, etc.

The content scanners 474 pass the relevant information to a statistical analysis module 478. The statistical analysis module 478 may be programmed to compile data about the information it receives from the content scanners 474. The compiled data may include, for example, which entities appear in relevant information received from multiple sources, which entities appeared more than a threshold number of times in a given period, which entities experience an increase above some threshold amount in the number of appearances, which entities have recently been the subject of a NL query received by the system 100, which entities appeared most often, etc. In short, the statistical analysis module 478 may provide any type of statistical analysis that the caching manager 124 may use to decide whether to pre-generate and/or store an entity page. In some embodiments, the content scanners 474 may provide information directly to a storage decision module 482 instead of to the statistical analysis module 478, and the storage decision module 482 may make decisions about pre-generating and/or storing entity pages based upon information that does not require additional analysis. In some embodiments, the statistical analysis module 478 and the storage decision module 482 may be combined.

In causing the system 100 to pre-generate and store entity pages, the caching manager 124 may consider information other than received NL queries and data gleaned from the external sources 470. For example, the caching manager 124 may have access to or be programmed with additional information. The caching manager 124 may cause the NL query answering engine 116 to generate and store an entity page according to the programmed information. For example, the caching manager 124 may be programmed to cause the generation and storage of entity pages for various holidays seven days prior to the holiday (e.g., generate and store an entity page for Christmas on December 18, an entity page for United States Independence Day on June 27, an entity page for St. Valentine's Day on February 7, etc.). As another example, the caching manager 124 may be programmed to cause each day the generation and storage of an entity page for the current date. For purposes of illustration, the entity page generated for each date may include information such as the date's position within the year (e.g., $201^{st}$ day of the year, $29^{th}$ week of the year), holidays and observances that take place on the date (e.g., May Day, Boxing Day, etc.), notable anniversaries and birthdays for the date, a depiction of the Earth's orientation with respect to the Sun on the date, etc.

In addition to causing the generation and storage of entity pages, the caching manager 124 may also cause the periodic update and/or re-generation and re-storage of entity pages stored in the answers database 120. Various events may trigger updates of entity pages, including the expiration of a period of time, the occurrence of an event, an increase in news mentions about the entity, etc. For example, if an entity page for the entity "today" (which might be the same as the entity page for the current date) is stored in the answers database 120, the caching manager 124 may cause the daily re-generation and re-storage of that entity page. As another example, the caching manager 124 may cause an entity page for "Academy Awards nominations" to be updated upon receipt of information indicating that the most recent nominations have occurred, or to be updated upon receipt of information indicating that the winners have been announced. As yet another example, and with reference to the illustration of FIG. 6A, the caching manager 124 may cause an update to the entity page for "Olympic Medals Australia cycling" when it receives information that an additional event has occurred (e.g., during an Olympic games). As still another example, the caching manager 124 may cause an update to an entity page to occur upon detecting an increase in the number of recent headlines related to the entity, which may indicate that new and/or potentially relevant information about the entity is available.

Similarly, the caching manager 124 may cause deletion of an entity page from the answers database 120. Entity pages may have associated expiration dates, the passage of which causes the caching manager 124 to delete them from the answers database 120. Alternatively, the caching manager 124 may track statistical and/or historical data for the entity or the entity page. The data may include how often the entity page is retrieved, how long since the entity page was last viewed, a decrease in some measure (e.g., mentions in news items, blogs, etc.) related to the entity, or any other measure determined to be useful. For example, the caching manager 124 may cause generation and storage of an entity page in the answers database 120 in response to a 100% increase in daily news articles about the entity over the previous day, and/or may cause the deletion of the entity page upon detecting a 50% decrease in daily news articles about the entity over the previous day. As another example, the caching manager 124 may cause generation and storage of an entity page in response to the system 100 receiving 10 or more queries about the entity in one day, and/or may cause the deletion of the entity page upon receiving five or fewer queries about the entity in one day. Of course, numerous other trigger conditions could lead to creation or deletion of an entity page, and such trigger conditions, while not specifically elaborated here, are apparent in view of the present disclosure.

A query generation module 486 may be responsible for generating queries related to the entities for which the storage decision module 482 determines an entity page should be stored. The query generation module 486 may also generate queries related to a received query, for example by executing the algorithm 400, described above. One or more of the statistical analysis module 478, the storage decision module 482 and the query generation module 486 may be connected to other parts of the NL query answering system 104, including the entities database 128, the NL query answering engine 116, and the answers database 120.

In embodiments in which the entity pages are web pages or are included in web pages, the web pages may be exposed to Internet search engines. Referring again to FIG. 1, for instance, the web server 106 may expose entity pages stored in the database 120 to Internet search engines. Similarly, in systems meant for use within an organization, the entity pages in the pre-generated answers database may be exposed to a search facility.

Any of the techniques described above, including those described with reference to FIGS. 1-7, may be implemented using a processor that executes machine readable software or firmware instructions. Such computer program instructions may control the operation of a computing device such as a desktop computer, a laptop computer, a tablet computer, a workstation, a server, a mainframe, a mobile phone (e.g., a smart phone), a telephone, a set top box, a personal digital assistant (PDA), a pager, a processing system of an electronic game, a processing system of a consumer electronics device, etc. The computing device may have a processor and a memory in which the computer program instructions may be stored. The processor is coupled to the memory and executes the computer program instructions. The computer program instructions may be written in any high level language such as the programming language used with MATHEMATICA® software systems, C, C++, C#, Java or the like or any low-level assembly or machine language. By storing computer program instructions in a memory of the computing device, the computing device is physically and/or structurally configured in accordance with the computer program instructions.

While many methods and systems have been described herein as being implemented using a processor executing machine readable instructions, they may be implemented at least partially in hardware, and may be implemented by a variety of computing systems and devices. Thus, the method blocks and system blocks described herein may be implemented in a standard multi-purpose central processing unit (CPU), a special purpose CPU, or on specifically designed hardware such as an application-specific integrated circuit (ASIC) or other hard-wired device as desired. When implemented using a processor executing machine readable instructions, the machine readable instructions may be stored in any computer readable memory such as on a magnetic disk, a laser disk (such as a compact disk (CD), a digital versatile disk (DVD)), a flash memory, a memory card, a memory stick, etc., or other storage medium, in a RAM or ROM of a computer or processor, in any database, etc. Likewise, the machine readable instructions may be delivered via any known or desired delivery method including, for example, on a computer readable memory or other transportable computer storage mechanism or over a communication channel such as a telephone line, the internet, etc. (which are viewed as being the same as or interchangeable with providing such software via a transportable storage medium).

The present disclosure has been described with reference to specific examples, which are intended to be illustrative only and not to be limiting. It will be apparent to those of ordinary skill in the art that changes, additions, or deletions may be made to the disclosed examples without departing from the spirit and scope of the disclosure. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of this application.

Thus, many modifications and variations may be made in the techniques and systems described and illustrated herein without departing from the spirit and scope of the present invention. Accordingly, it should be understood that the methods and systems described herein are illustrative only and are not limiting upon the scope of the claims.

We claim:

1. A method for use in a natural language (NL) system that generates answers to NL queries, the method comprising:
generating, using one or more computing devices, one or more predicted queries representing one or more potential queries that may be received subsequently by the NL system;
providing, using one or more computing devices, the one or more predicted queries to an NL query answering system implemented by one or more computing devices;
receiving, from the NL query answering system, one or more respective answers to the one or more predicted queries;
generating, using one or more computing devices, one or more web pages corresponding to the one or more respective answers, wherein each web page is configured to display the respective answer;
storing the one or more web pages in a first database;
receiving a NL query;
determining, using one or more computing devices, whether a pre-generated web page that includes an answer to the NL query is stored in the first database;
when the pre-generated web page that includes the answer to the NL query is stored in the first database, providing the pre-generated web page via a network; and
when no pre-generated web page that includes the answer to the NL query is stored in the first database:
generating, using one or more computing devices, an answer based on data stored in a second database,
generating, using one or more computing devices, a new web page that includes the answer to the NL query; and
providing the new web page via the network in response to the NL query.

2. The method of claim 1, further comprising:
determining, using one or more computing devices, whether to store the new web page to the first database; and
storing in the first database the new web page when it is determined that the new web page should be stored.

3. The method of claim 2, further comprising making the stored new web page available to one or more search engines separate from the NL system.

4. The method of claim 2, wherein determining whether to store the new web page is based on a determined likelihood that the NL query will be received subsequently.

5. The method of claim 4, wherein determining whether to store the new web page is based on at least one of a number of times that the NL query is received or a frequency that the NL query is received.

6. The method of claim 4, wherein determining whether to store the new web page is based on a determined level of interest in an entity corresponding to the NL query measured from data external to the NL system.

7. The method of claim 6, wherein determining whether to store the web page data is based on data from at least one of news feeds, RSS (Really Simple Syndication) feeds, community news websites, search engine trend reports, trend reports from a web-based reference source, news aggregator services, social networking sites, and blogs.

8. The method of claim 1, wherein determining whether the pre-generated web page that includes the answer is stored in the first database comprises:
   interpreting, using one or more computing devices, the received NL query;
   determining, using one or more computing devices, two or more potentially intended queries corresponding to the received NL query;
   making, using one or more computing devices, an assumption to select an intended query from the potentially intended queries; and
   determining, using one or more computing devices, whether the pre-generated web page that includes the answer is stored in the first database based on the selected intended query.

9. A method for use in a natural language (NL) system that generates answers to NL queries, the method comprising:
   generating, using one or more computing devices, a set of one or more potential alternative NL queries that are related to a first NL query;
   providing, using one or more computing devices, the set of one or more potential alternative NL queries to an NL query answering system implemented by one or more computing devices;
   receiving, from the NL query answering system, one or more respective answers to the one or more potential alternative NL queries in the set, wherein the one or more respective answers are based on data stored in a first database;
   generating, using one or more computing devices, one or more web pages corresponding to the one or more respective answers, wherein each web page is configured to display the respective answer; and
   storing in a second database the one or more web pages.

10. The method of claim 9, wherein generating, using one or more computing devices, a set of one or more potential alternative NL queries that are related to a first NL query comprises:
   receiving the first NL query;
   interpreting, using one or more computing devices, the first NL query to generate a disambiguated second query; and
   algorithmically varying, using one or more computing devices, the disambiguated second query to generate one or more third queries.

11. The method of claim 10, wherein interpreting the first NL query to generate a disambiguated second query comprises:
   disambiguating, using one or more computing devices, the first NL query to determine a first entity associated with the first NL query; and
   determining, using one or more computing devices, a category of the first entity; and
   wherein algorithmically varying the disambiguated second query to generate one or more third queries comprises substituting, using one or more computing devices, for the first entity one or more second entities of the same category as the first entity.

12. The method of claim 10, wherein interpreting the first NL query to generate a disambiguated second query comprises disambiguating, using one or more computing devices, the first NL query using one or more first parameters not included in the first NL query, the one or more first parameters including one or more of: browser type, language, location, internet service provider, time of the query, and date of the query; and wherein algorithmically varying the disambiguated second query to generate one or more third queries comprises substituting, using one or more computing devices, for the one or more first parameters one or more second parameters.

13. The method of claim 9, wherein interpreting the first NL query to generate a disambiguated second query comprises:
   disambiguating, using one or more computing devices, the first NL query to determine a first entity associated with the first NL query; and
   determining, using one or more computing devices, a queried attribute of the first entity; and
   wherein algorithmically varying the disambiguated second query to generate one or more third queries comprises substituting, using one or more computing devices, for the queried attribute one or more second attributes of the first entity.

14. The method of claim 9, wherein generating, using one or more computing devices, a set of one or more potential NL queries that are related to a first NL query comprises determining, using one or more computing devices, for at least one of the potential NL queries a likelihood of receiving the at least one potential NL query.

15. The method of claim 14, wherein the determined likelihood is based on a plurality of previously received NL queries.

16. The method of claim 15, wherein the plurality of previously received NL queries is received within a predetermined span of time.

17. The method of claim 9, wherein generating, using one or more computing devices, a set of one or more potential alternative NL queries comprises receiving one or more of the following information:
   data from a news source;
   data from a blogging service;
   data from a social networking service;
   data from a community-based news article website;
   data from a news aggregator;
   trend data from a web-based reference source, the trend data describing recent search statistics related to the web-based reference source; and
   trend data from a search engine, the trend data describing recent search statistics related to the search engine.

18. The method of claim 17, wherein the received data are received by one of a search bot, a web feed, and a news feed.

19. The method of claim 9, wherein generating, using one or more computing devices, a set of one or more potential alternative NL queries comprises algorithmically varying, using one or more computing devices, a received query to generate a set of one or more potential NL queries that are related to the received query.

20. A natural language (NL) system comprising:
a first database to store data relevant to entities;
a second database to store web page data, the web page data including web pages configured to display answers to NL queries;
a caching manager, communicatively connected to each of the first database and second database, the caching manager configured to:
receive data representing a received NL query,
determine whether the second database contains a first web page configured to display an answer to the received NL query, and
fetch the first web page from the second database when the first web page is stored in the second database, wherein the first web page is made available to the network; and
a NL query answering engine, communicatively connected to the caching manager, the NL query answering engine configured to determine an answer to the received NL query when it is determined that the first web page is not stored on the second database, wherein the answer to the received NL query is determined using data from the first database;
wherein the caching manager is further configured to, after the NL query answering engine determines the answer to the received NL query:
determine, using one or more computing devices, whether to store a new web page to the second database, the new web page including the answer to the received NL query determined by the NL query answering engine, and store in the second database the new web page when it is determined that the new web page should be stored.

21. The NL system of claim 20, wherein the first database comprises:
a plurality of entities categorized by class and sub-class,
a plurality of attributes associated with the entities.

22. The NL system of claim 20, wherein the first database comprises:
a plurality of entities categorized into one of a plurality of classes and sub-classes; and
a plurality of attributes, each attribute associated with at least one of the plurality of classes and sub-classes.

23. The NL system of claim 20, wherein the second database comprises web page data representing a plurality of pre-generated web pages configured to display answers to NL queries, each of the plurality of pre-generated web pages corresponding to one or more of a plurality of queries.

24. The NL system of claim 23, wherein each of the plurality of pre-generated web pages comprises one or more of: static information, programming code indicating a source from which to retrieve dynamic information.

25. The NL system of claim 23, wherein one or more of the plurality of pre-generated web pages has an associated date on which the generated web page will be deleted or updated.

26. The NL system of claim 20, wherein the NL query answering engine comprises:
a parser;
one or more scanners; and
one or more post-processors.

27. A non-transitory tangible storage medium having stored thereon machine executable instructions, the machine executable instructions, when executed by one or more machines, causing the one or more machines to:
generate a set of one or more potential alternative natural language (NL) queries that are related to a first NL query;
provide the set of one or more potential alternative NL queries to an NL query answering system implemented by one or more computing devices;
receive, from the NL query answering system, one or more respective answers to the one or more potential alternative NL queries in the set, wherein the one or more respective answers are based on data stored in a first database;
generate one or more web pages corresponding to the one or more respective answers, wherein each web page is configured to display the respective answer; and
store in a second database the one or more web pages.

28. The non-transitory tangible storage medium of claim 27, wherein the instructions cause the one or more machines to:
receive the first NL query;
interpret the first NL query to generate a disambiguated second query; and
algorithmically vary the disambiguated second query to generate one or more third queries.

29. The non-transitory tangible storage medium of claim 28, wherein the instructions cause the one or more machines to:
disambiguate the first NL query to determine a first entity associated with the first NL query; and
determine a category of the first entity; and
wherein algorithmically varying the disambiguated second query to generate one or more third queries comprises substituting for the first entity one or more second entities of the same category as the first entity.

30. The non-transitory tangible storage medium of claim 28, wherein interpreting the first NL query to generate a disambiguated second query comprises disambiguating the first NL query using one or more first parameters not included in the first NL query, the one or more first parameters including one or more of: browser type, language, location, internet service provider, time of the query, and date of the query; and
wherein algorithmically varying the disambiguated second query to generate one or more third queries comprises substituting for the one or more first parameters one or more second parameters.

31. The non-transitory tangible storage medium of claim 27, wherein the instructions cause the one or more machines to:
disambiguate the first NL query to determine a first entity associated with the first NL query; and
determine a queried attribute of the first entity; and
wherein algorithmically varying the disambiguated second query to generate one or more third queries comprises substituting for the queried attribute one or more second attributes of the first entity.

32. The non-transitory tangible storage medium of claim 27, wherein determining a set of one or more potential NL queries that are related to a first NL query comprises determining for at least one of the potential NL queries a likelihood of receiving the at least one potential NL query.

33. The non-transitory tangible storage medium of claim 32, wherein the determined likelihood is based on a plurality of previously received NL queries.

34. The non-transitory tangible storage medium of claim 33, wherein the plurality of previously received NL queries is received within a predetermined span of time.

35. The non-transitory tangible storage medium of claim 27, wherein determining a set of one or more potential NL queries comprises receiving one or more of the following information:
- data from a news source;
- data from a blogging service;
- data from a social networking service;
- data from a community-based news article website;
- data from a news aggregator;
- trend data from a web-based reference source, the trend data describing recent search statistics related to the web-based reference source; and
- trend data from a search engine, the trend data describing recent search statistics related to the search engine.

36. The non-transitory tangible storage medium of claim 35, wherein the received data are received by one of a search bot, a web feed, and a news feed.

37. The non-transitory tangible storage medium of claim 27, wherein determining a set of one or more potential NL queries comprises algorithmically varying a received query to generate a set of one or more potential NL queries that are related to the received query.

\* \* \* \* \*